(12) United States Patent
Boschet

(10) Patent No.: US 10,654,225 B2
(45) Date of Patent: May 19, 2020

(54) METHOD AND A THERMOPLASTIC BLADE

(71) Applicant: AIRBUS HELICOPTERS, Marignane (FR)

(72) Inventor: Patrick Boschet, Montigny le Bretonneux (FR)

(73) Assignee: AIRBUS HELICOPTERS, Marignane (FR)

( * ) Notice: Subject to any disclaimer, the term of this patent is extended or adjusted under 35 U.S.C. 154(b) by 247 days.

(21) Appl. No.: 15/603,628

(22) Filed: May 24, 2017

(65) Prior Publication Data

US 2017/0341312 A1 Nov. 30, 2017

(30) Foreign Application Priority Data

May 25, 2016 (FR) ...................................... 16 00841

(51) Int. Cl.
*B29C 70/02* (2006.01)
*B29C 35/02* (2006.01)
(Continued)

(52) U.S. Cl.
CPC ........ *B29C 70/025* (2013.01); *B29C 35/0272* (2013.01); *B29C 35/0805* (2013.01);
(Continued)

(58) Field of Classification Search
CPC ..... B29C 65/02; B29C 65/14; B29C 65/1403; B29C 65/34–3696
See application file for complete search history.

(56) References Cited

U.S. PATENT DOCUMENTS 4,137,218 A 1/1979 Prevorsek et al.
4,605,465 A * 8/1986 Morgan .................. B32B 37/12
156/273.3
(Continued)

FOREIGN PATENT DOCUMENTS

CN 101730618 A 6/2010
EP 06044297 6/1994
(Continued)

OTHER PUBLICATIONS

First Office Action for Chinese Application No. 201710377651.6, dated Dec. 26, 2018, 6 pages.
(Continued)

*Primary Examiner* — Matthew J Daniels
*Assistant Examiner* — Andrew L Swanson
(74) *Attorney, Agent, or Firm* — Brooks Kushman P.C.

(57) ABSTRACT

A method of fabricating a blade. The blade comprises subassemblies made of thermoplastic composite materials, each subassembly comprising an internal arrangement and at least one external arrangement, each internal arrangement comprising a stack of intermediate layers comprising reinforcing fibers impregnated with a semicrystalline thermoplastic matrix, each external arrangement comprising at least one surface layer comprising reinforcing fibers impregnated with an alloy of a semicrystalline thermoplastic polymer and of an amorphous thermoplastic polymer. An assembly film comprising an amorphous thermoplastic material and a ferromagnetic member is interposed between two surface layers of two distinct subassemblies that are to be assembled together by a method of local heating by induction.

20 Claims, 3 Drawing Sheets

(51) Int. Cl.
  *B29C 70/34*   (2006.01)
  *F03D 1/06*   (2006.01)
  *B29D 99/00*   (2010.01)
  *B29C 35/08*   (2006.01)
  *B29L 31/08*   (2006.01)
  *B29C 65/36*   (2006.01)
  *B29C 65/34*   (2006.01)
  *B29K 71/00*   (2006.01)
  *B29K 105/16*   (2006.01)

(52) U.S. Cl.
  CPC .......... *B29C 70/34* (2013.01); *B29D 99/0025* (2013.01); *F03D 1/0675* (2013.01); *B29C 65/34* (2013.01); *B29C 65/3604* (2013.01); *B29C 65/3676* (2013.01); *B29C 2035/0811* (2013.01); *B29K 2071/00* (2013.01); *B29K 2105/16* (2013.01); *B29K 2995/0008* (2013.01); *B29L 2031/08* (2013.01); *B29L 2031/082* (2013.01); *F05B 2280/4007* (2013.01); *Y02E 10/721* (2013.01); *Y02P 70/523* (2015.11)

(56) References Cited

U.S. PATENT DOCUMENTS

| | | | | |
|---|---|---|---|---|
| 5,454,693 | A | 10/1995 | Aubry et al. | |
| 5,462,408 | A | 10/1995 | Coffy | |
| 5,961,288 | A | 10/1999 | Legendre et al. | |
| 2009/0148300 | A1* | 6/2009 | Driver | B29C 65/3412 416/223 R |
| 2010/0065552 | A1* | 3/2010 | Matsen | B29C 35/0272 219/671 |
| 2011/0062287 | A1 | 3/2011 | Metzech et al. | |
| 2011/0171024 | A1* | 7/2011 | Jensen | F03D 1/0675 416/1 |
| 2013/0134621 | A1 | 5/2013 | Tsotsis et al. | |
| 2013/0149498 | A1* | 6/2013 | Wilkerson | B29C 70/40 428/156 |
| 2014/0030093 | A1* | 1/2014 | Dahl | F03D 1/0675 416/95 |
| 2014/0110633 | A1* | 4/2014 | Pratte | B32B 38/0008 252/500 |
| 2015/0258765 | A1* | 9/2015 | Van Voast | B32B 41/00 156/64 |
| 2016/0059479 | A1* | 3/2016 | Menochet | B29C 65/20 156/153 |

FOREIGN PATENT DOCUMENTS

| | | | | |
|---|---|---|---|---|
| EP | 1880833 | | 1/2008 | |
| EP | 2256034 | | 12/2010 | |
| FR | 2699498 | | 6/1994 | |
| FR | 2699499 | | 6/1994 | |
| FR | 2756211 | | 5/1998 | |
| GB | 2463250 | | 3/2010 | |
| GB | 2463250 A | * | 3/2010 | .......... B29C 65/342 |
| JP | 2016514637 A | | 5/2016 | |
| WO | 2010025830 A2 | | 3/2010 | |

OTHER PUBLICATIONS

Notice of Preliminary Rejection for Korean Application No. 10-2017-0064873, dated May 14, 2018, 9 Pages.

French Search Report for French Application No. FR 1600841, Completed by the French Patent Office, dated Feb. 17, 2017, 7 Pages.

* cited by examiner

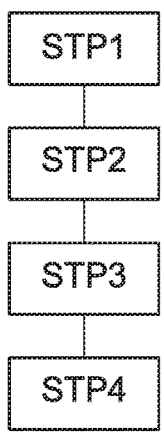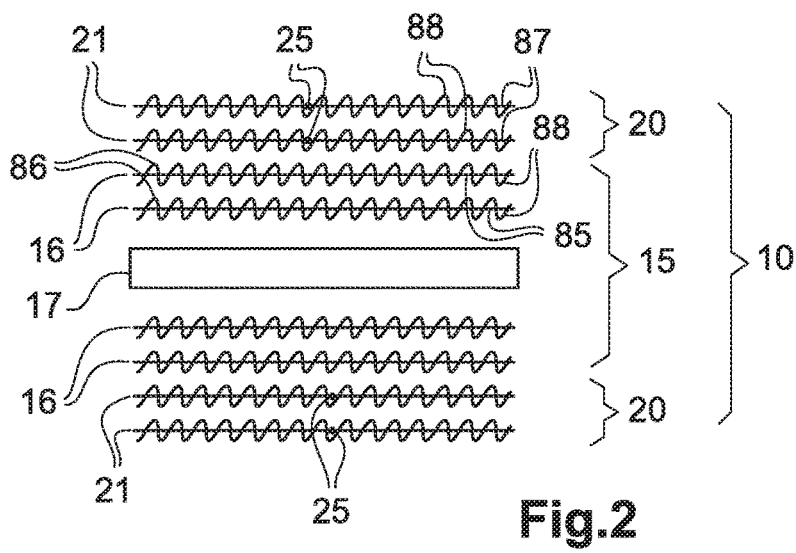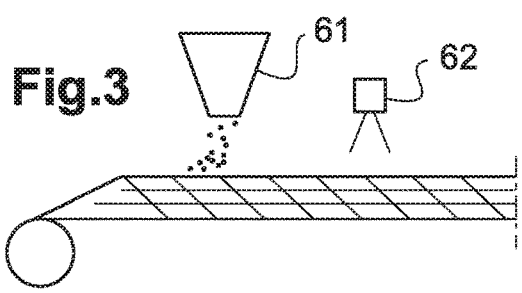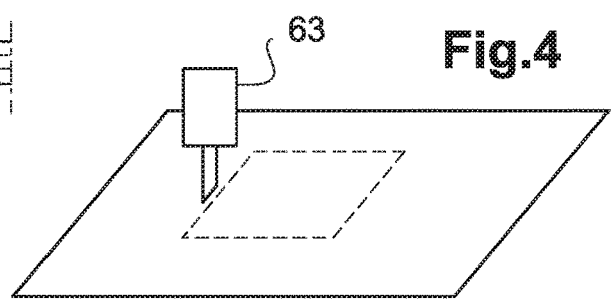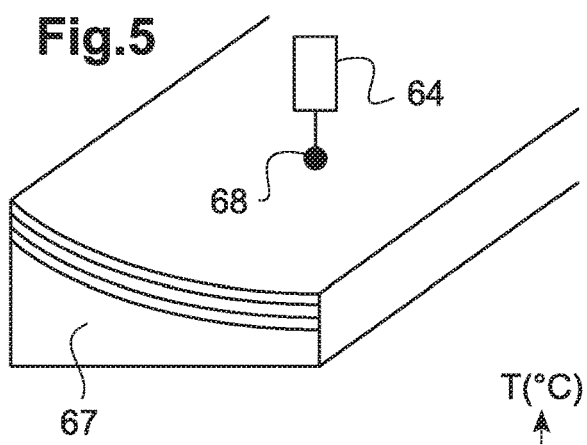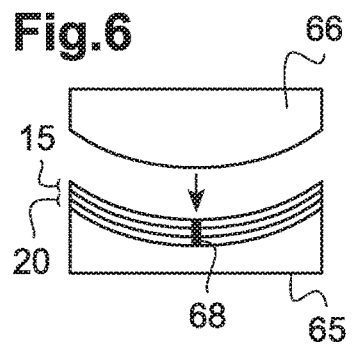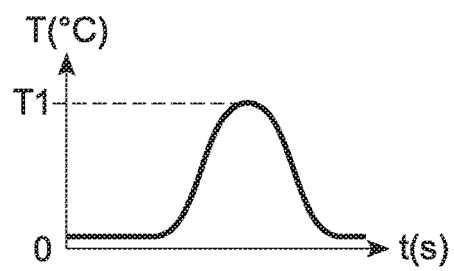

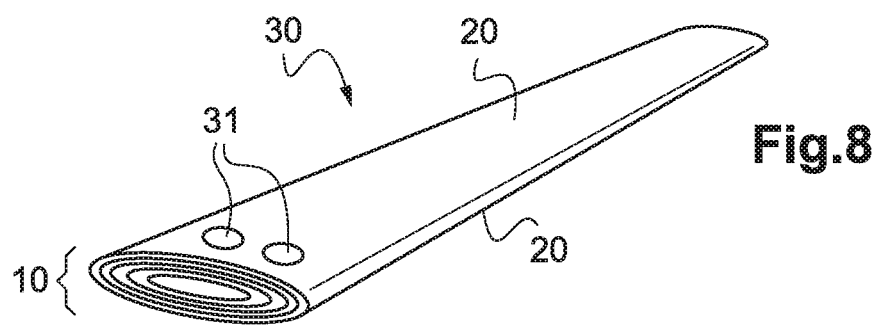
Fig.8
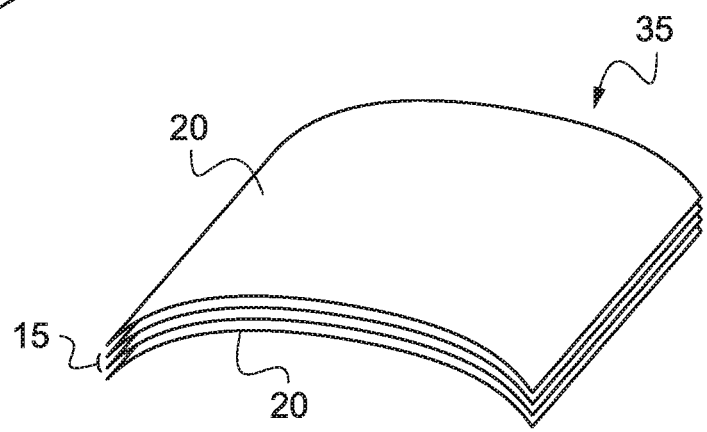
Fig.9
Fig.10
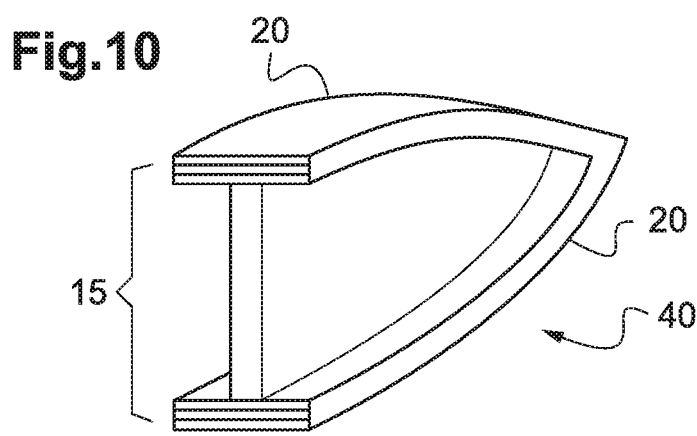
Fig.11
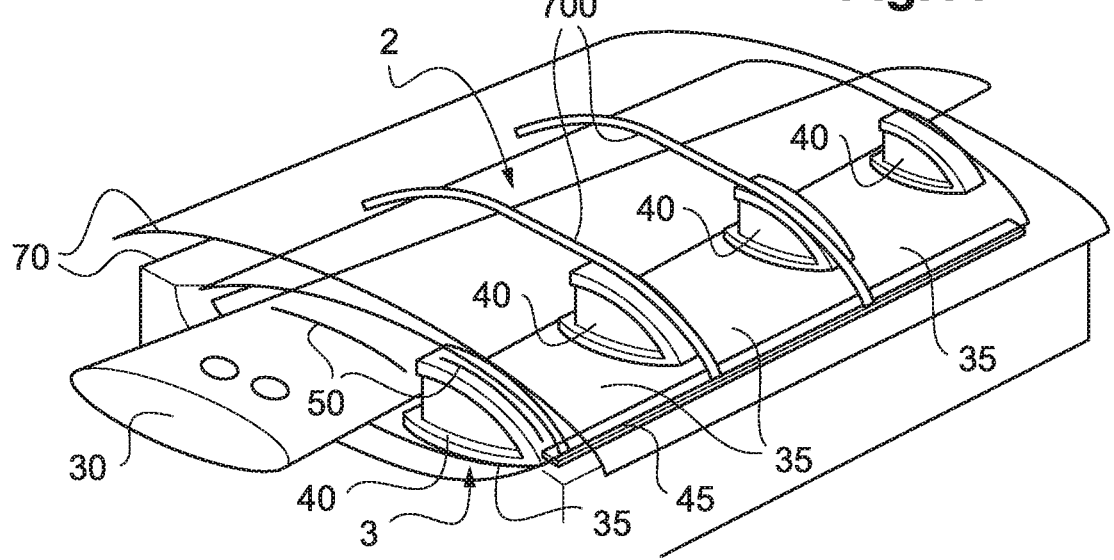

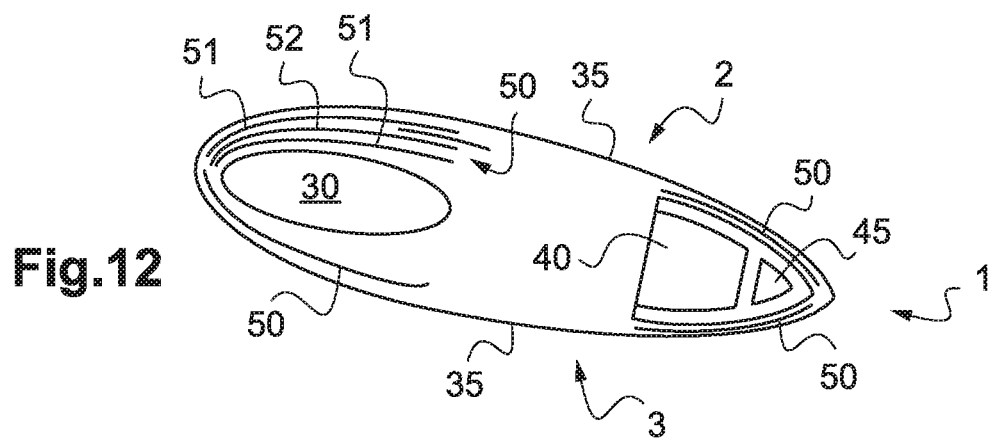
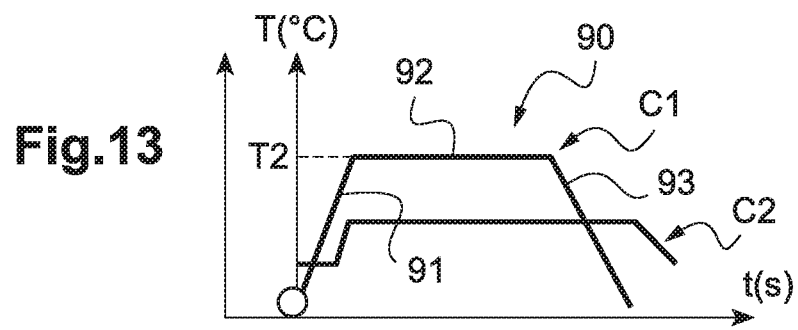
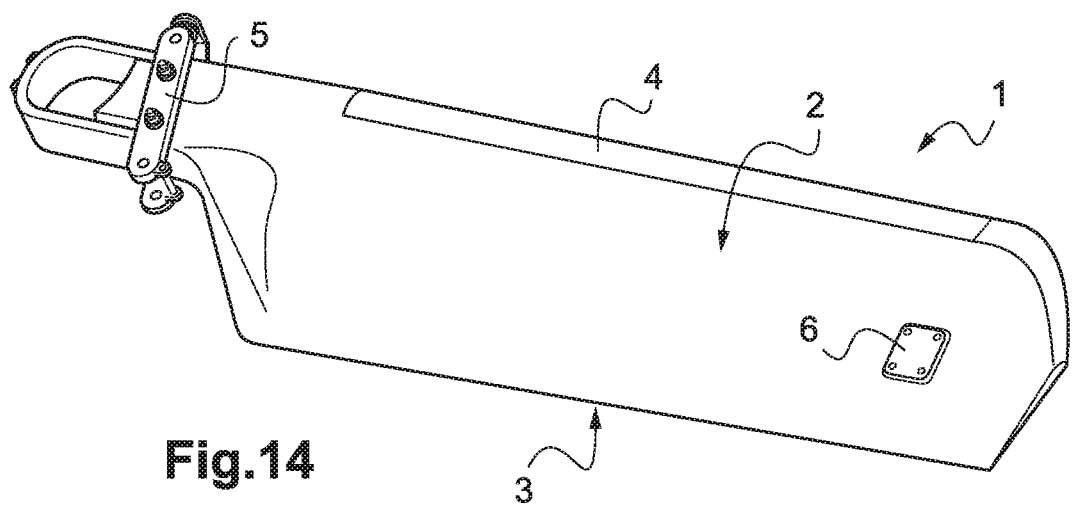

US 10,654,225 B2

METHOD AND A THERMOPLASTIC BLADE

CROSS-REFERENCE TO RELATED APPLICATIONS

This application claims priority to European patent application No. FR 16 00841 filed on May 25, 2016, the disclosure of which is incorporated in its entirety by reference herein.

BACKGROUND OF THE INVENTION

(1) Field of the Invention

The present invention relates to a blade referred to as a "thermoplastic" blade, and to a method of fabricating such a blade, in particular for a rotorcraft. The invention thus lies in the technical field of blades made using fibers and thermoplastic matrices.

(2) Description of Related Art

A blade comprises various members including an outer skin and at least one spar. The blade may also include such other members as, but not limited to, ribs, reinforcement, and a trailing edge strip.

The blade may be made out of composite materials.

In particular, blades are usually made from organic or inorganic fibers and matrices of thermosetting resins. Such a blade is referred to for convenience as a "thermosetting" blade because it makes use of such thermosetting resins.

For example, the elements making up the skins, the ribs, the reinforcement, and the spars are deposited directly in a mold. After applying a polymerization cycle, those various elements are assembled together by a co-curing principle.

At the end of this curing, the blade is unmolded, prepared for painting, and painted.

Thermosetting blades are widespread. Nevertheless, the use of thermosetting resins is found to be constraining.

Specifically, polymerization is an irreversible phenomenon of chemical transformation. During the polymerization cycle, the thermosetting resin passes irreversibly from a "liquid" state to a solid state.

In addition, the chemical compounds used in compositions for composite materials raise problems of time limits for storage.

Furthermore, certain chemical compounds used in composite material compositions have been banned by certain legislations for toxicological reasons, or they run the risk of being banned in the future.

For example, impregnating fibers by a "solvent" technique with methylene chloride is now banned by certain legislations.

Document EP 0 604 297 proposes a blade made from organic or inorganic fibers and matrices based on thermoplastic resins. Such a blade is referred to for convenience as a "thermoplastic" blade because of its use of thermoplastic materials.

Documents FR 2 699 498 and FR 2 699 499 disclose a blade made from thermoplastic composite materials.

According to document FR 2 699 499, the skins and the spars are made from thermoplastic composite materials. The skins and the spars are placed in an injection mold. Thereafter, a fluid composite material comprising short reinforcing fibers embedded in a thermoplastic matrix that is heated to a melting temperature is injected into the mold in order to form filler bodies or an internal reinforcing cuff for a blade root.

The fluid composite material comprises matrix granules made of poly ether ether ketone, known under the acronym "PEEK" having short carbon fibers embedded therein. Prior to any use, the granules are stoved to a temperature of about 150 degrees Celsius (° C.) for at least three hours. Thereafter, the granules are heated to a temperature of about 400° C. prior to being injected into the mold, with the mold being maintained at a temperature of about 150° C. to 200° C.

That method is advantageous, but it requires an entire mold to be heated to high temperatures and it requires granules to be heated to very high temperatures.

Document EP 2 256 034 describes a method of fabricating a blade by injecting a thermosetting resin.

Document EP 1 880 833 relates to wind turbine blades comprising thermoplastic matrices on glass fibers.

Document FR 2 756 211 does not belong to the technical field of blades and is mentioned solely by way of remote technological background.

Likewise, document U.S. Pat. No. 4,137,218 does not belong to the technical field of blades and is mentioned by way of remote technological background. That document discloses a constitution for a thermoplastic polyester that is based on benzophenone, and a method of fabricating it.

Document GB 2 463 250 describes a method of fabricating a turbine blade. The blade has at least two segments, each segment having at least one end region made of thermoplastic material.

Document GB 2 463 250 describes a method of fabricating a turbine blade. The blade has at least two segments, each segment having at least one end region made of thermoplastic material.

Document US 2016/059479 does not belong to the field of the invention since it relates to welding together an elastomer and a composite material.

Document US 2013/134621 is also remote from the invention.

BRIEF SUMMARY OF THE INVENTION

An object of the present invention is thus to propose a method of fabricating an innovative thermoplastic blade. In particular, the blade may be a blade of an aircraft rotor, such as a rotor of a rotary wing or a rotor for controlling yaw movement of an aircraft, for example, or an airplane propeller blade, or indeed a turbine blade, . . . .

The invention thus provides a method of fabricating a blade. The method comprises the following steps:

fabricating subassemblies out of thermoplastic composite materials, each subassembly comprising an internal arrangement and at least one external arrangement joined to the internal arrangement, the external arrangement of one subassembly being for adhesively bonding to an external arrangement of another subassembly, each internal arrangement comprising a stack of plies referred to as "intermediate" layers, each intermediate layer comprising reinforcing fibers impregnated with a semicrystalline thermoplastic matrix, each external arrangement comprising at least one ply referred to as a "surface" layer, each surface layer comprising reinforcing fibers impregnated with an alloy of a semicrystalline thermoplastic polymer and an amorphous thermoplastic polymer;

placing the subassemblies in an assembly mold;

locally arranging a plurality of assembly films comprising an amorphous thermoplastic material and a ferromagnetic member, each assembly film being interposed between two surface layers of two distinct subassemblies that are to be assembled together; and assembling the subassemblies together in the assembly mold by exerting pressure on said subassemblies and by locally heating each assembly film by induction in application of a cycle for appropriately applying heat and pressure.

In order to finish off fabrication, various elements may be fitted to the blade. Thus, metal or ceramic rings may be fitted by adhesive or drink fitting, e.g. on a spar. Such rings may co-operate with pins for fastening to a hub or indeed with pitch rods. Likewise, a leading edge protection cover, which may optionally contain a de-icer, may be adhesively bonded to the blade.

Consequently, in this method, subassemblies are fabricated separately. Each subassembly comprises a core made from semicrystalline thermoplastic matrices giving good strength to the reinforcing fibers. In addition, each subassembly has an interface surface for subsequently adhesively bonding to another subassembly. This interface surface comprises not only a semicrystalline thermoplastic matrix, but also an amorphous thermoplastic matrix. The amorphous thermoplastic matrix enhances adhesive bonding between one subassembly and another subassembly by possessing good diffusion ability, unlike a semicrystalline thermoplastic matrix.

Furthermore, a thermoplastic film is placed between two bonding zones of two subassemblies. The thermoplastic film is also provided with an amorphous thermoplastic matrix for enhancing bonding. Furthermore, the thermoplastic film does not have reinforcing fibers, but does include a ferromagnetic member.

Under such circumstances, during the assembly step, the ferromagnetic member is excited by an electromagnetic inductor in order to heat the blade locally. The method thus makes provision for using induction heating on heating zones that are limited to predetermined cohesion zones that are covered by the thermoplastic film.

Unlike methods making provision for injecting resins heated to high temperatures, this method proposes assembling the subassemblies together locally by diffusing amorphous thermoplastic matrices by using electromagnetic induction.

Under such circumstances, the other zones of the subassemblies are not heated very much, which makes it possible to avoid having any impact on the structural integrity of the subassemblies.

Specifically, a thermoplastic material can be subjected to a plurality of softening cycles by heating, unlike a thermosetting material. Under such circumstances, a step of assembling thermoplastic subassemblies by heating would run the risk of deforming the subassemblies. The method of the invention serves to remedy that by using a film provided with an amorphous thermoplastic material having great capacity for diffusion and that is heated locally by induction.

Furthermore, heating by electromagnetic induction makes it possible, very quickly, to reach a temperature higher than the glass transition temperature of the thermoplastic film and thus to occupy a "rubber plateau" zone. The thermoplastic film is thus quickly softened in order to enhance tangling and diffusion of macromolecular chains of the amorphous thermoplastic material in the subassemblies that are to be bonded together.

In addition, induction heating can then serve to optimize the electrical energy needed for performing the assembly step.

The method thus makes it possible to obtain an innovative blade made with thermoplastic materials on the basis of subassemblies. The subassemblies are optionally made using a single shaping press.

The use of thermoplastic materials also makes it possible to solve storage and environmental problems associated with using certain thermosetting materials. Furthermore, thermoplastic matrices present very high levels of viscosity compared with the levels of viscosity of thermosetting matrices, thereby tending to reduce manufacturing disparities associated with thermosetting matrices creeping, and thus making it possible to obtain better control over the final weight of each assembly, which facilitates the operation of balancing the final blade.

This method thus constitutes an approach that is "eco-friendly" both in terms of the materials selected and in terms of the heating systems used with possible reduction in the amount of energy needed to fabricate the blade. Furthermore, the blade can be finalized by applying "powder paint" in an approach that is even more eco-friendly.

The method may also be applied by robots so as to optimize the organization of a dedicated fabrication line, optimizing the floor area needed.

Furthermore, and in order to optimize the method, various subassemblies can be made in succession in campaigns for making large numbers of them, and can be stored at ambient temperature. Working in campaigns tends to minimize the reject rate.

Furthermore, the method is applicable to making both blades of small dimensions, e.g. for a rotor for controlling jaw movements of a helicopter, and blades of large dimensions, e.g. for a helicopter lift rotor, or indeed an airplane propeller, or such other applications as turbine blades, and the like.

The method may also include one or more of the following characteristics.

Optionally, the amorphous thermoplastic material of the assembly films includes at least the amorphous thermoplastic polymer of the surface layer.

This characteristic can tend to optimize bonding between two subassemblies. Furthermore, this characteristic makes it possible to limit the number of different materials that are used.

Furthermore, each reinforcing fiber may be selected from a list comprising at least: a glass fiber; a carbon fiber; a basalt fiber, and an aramid fiber.

Furthermore, each subassembly may be selected from a list comprising at least: a spar; a stiffener; an outer skin; and a trailing edge strip, or indeed an optional de-icer.

Such a blade may then be hollow, lacking any honeycomb or foam filler body that might be problematic from an environmental point of view, depending on how legislations change.

For example, said blade comprises at least one spar, at least one trailing edge strip, a plurality of stiffeners, and a plurality of outer skins, outer skins being joined to one another spanwise in order to form a suction side wall, outer skins being joined to one another spanwise in order to form a pressure side wall, the or each trailing edge strip, the or each spar, and each stiffener extending between said suction side wall and said pressure side wall, at least one stiffener being located at the junction between two outer skins in the pressure side wall and two outer skins in the suction side wall.

The stiffener may in particular have an I-shaped section.

The blade may thus mainly comprise thermoplastic subassemblies.

In another aspect, the semicrystalline thermoplastic matrix may be PEEK.

Each intermediate layer may thus comprise solely a matrix having 100% PEEK in order to present optimized structural characteristics.

For the surface layers, the semicrystalline thermoplastic polymer may be PEEK, while the amorphous thermoplastic polymer may be poly ether imide, "PEI".

Optionally, the alloy of a semicrystalline thermoplastic polymer and of an amorphous thermoplastic polymer may comprise 70% PEEK and 30% PEI.

This distribution makes it possible to obtain an alloy that presents both good structural characteristics and good diffusion ability.

Under such circumstances, a spar may be made using various materials. For example, each intermediate layer may be in the form of unidirectional UD PLAIN 80-20 or UD PLAIN 90-10 satin-5 fiber fabric impregnated with PEEK powder.

Each surface layer may be in the form of UD PLAIN 80-20 or 90-10 satin-5 fiber fabric with a thermoplastic polymer alloy comprising a mixture of 70% PEEK powder and 30% PEI powder.

For the skin function of the blade, several choices are also possible. For example, each intermediate layer may comprise 7781 glass fiber fabric or 7781 basalt fiber fabric or G963 carbon fiber fabric reinforcement powdered with PEEK powder. Each surface layer may comprise reinforcement made of 7781 glass fiber fabric or 7781 basalt fiber fabric or G963 carbon fiber fabric powdered with a mixture of 70% PEEK powder and 30% PEI powder.

The stiffeners may comprise reinforcement made of short fibers, of length lying in the range 2 millimeters (mm) to 10 centimeters (cm), e.g. impregnated with PEEK for the intermediate layers, and with a mixture of 70% PEEK powder and 30% PEI powder for the surface layers.

For the trailing edge strip, a unidirectional sheet powdered with PEEK for the intermediate layers and with a mixture of 70% PEEK powder and 30% PEI powder for the surface layers.

In another aspect, the amorphous thermoplastic material of an assembly film may comprise at least PEI.

Furthermore, the ferromagnetic member of an assembly film may comprise particles of ferrite or a metal element.

The term "metal element" is used to designate a structural part made of metal.

For example, a metal element may comprise a grid, for example a copper grid.

A metal element and/or very fine ferrite powder are incorporated in the thermoplastic matrix of the assembly film in order to serve as heater elements that respond to the induction heating.

The assembly film may also comprise a conductive metal fabric made of stretched copper of the Astrostrike® type or any other conductive fabric, sandwiched between two thicknesses of a thermoplastic matrix.

In another aspect, the amorphous thermoplastic material may include benzophenone and/or propriophenone.

The subassemblies are provided with intermediate layers comprising a thermoplastic matrix that is semicrystalline only. Under such circumstances, the subassemblies have a glass transition temperature of about 145° C.

Conversely, an assembly film provided solely with an amorphous thermoplastic matrix has a glass transition temperature of about 210° C. Adding benzophenone and/or propriophenone serves to obtain a glass transition temperature of about 150° C. for the assembly film (as a result of a relationship giving glass transition temperature (Tg) as a function of the concentration either of benzophenone or of propriophenone introduced into the film).

Thus, the assembly step may be performed at a temperature of 150° C. that is lower than said 210° C. so as to retain the integrity and the dimensional stability of the subassemblies during the final assembly operation.

In order to avoid the materials of the subassemblies relaxing dimensionally, the benzophenone or the propriophenone should be added into the assembly film. As a function of the concentrations used, the glass transition temperature of the assembly film may be about 150° C., while remaining above the glass transition temperature of the subassemblies. The lower the glass transition temperature of the assembly film, the more the thermokinetics of the diffusion of the plastics matrices is accelerated, in accordance with Pierre-Gilles DE GENNES' theory of creep.

In another aspect, said step of fabricating subassemblies may comprise the following stages for fabricating a subassembly:

arranging said plies in a fabrication mold; and heating said plies in the fabrication mold in application of a heating cycle that reaches a maximum temperature referred to as "hot" temperature.

The definition of an optimized heating cycle seeks to ensure that the thermodiffused structure is sound.

The plies may be arranged one by one in the fabrication mold.

Nevertheless, in a variant, and prior to the stage of arranging plies in the fabrication mold, the step of fabricating subassemblies comprises the following stages:

depositing plies one by one in a positioning mold, each ply deposited in the positioning mold being locally welded to the previously deposited ply, in order to guarantee very good orientation quality for the final reinforcement; and transferring the plies from the positioning mold to the fabrication mold.

For example, a wooden positioning mold is used for stacking the plies of a subassembly.

The plies are then transferred jointly into a fabrication mold, e.g. made of steel. The plies are then subjected to a heating cycle, being heated and compressed by a conventional press.

Furthermore, said plies of a subassembly comprise sized fibers, and prior to the stage of arranging said plies in a fabrication mold, the step of fabricating subassemblies may comprise the following fabrication stages applied to said sized fibers:

applying a powder of thermoplastic polymer on at least one de-sized reinforcing fiber; and bonding said thermoplastic polymer onto the de-sized reinforcing fiber by heating.

The plies may be made from de-sized fiber. The sizing function is reconstructed during the heating cycle so as to develop seed fibrils and thus semicrystalline growth on the fibers in order to improve the final fatigue performance of the subassemblies of the blade.

This characteristic is more particularly suitable for use with carbon fibers.

In another aspect, the cycle of applying heat and pressure in the assembly step may comprise a stage of raising the temperature of the assembly films to a maximum temperature referred to as the "assembly" temperature, a stage of maintaining said assembly temperature, followed by a stage of reducing the temperature of the assembly films, said assembly temperature being lower than said hot temperature.

The temperature rise stage and/or the temperature lowering stage may for example be performed with a temperature gradient of the order of 10° C. per minute.

Furthermore, the assembly temperature may lie in the range 150° C. to 210° C., the hot temperature lying in the range 350° C. to 450° C.

In another aspect, each surface layer may include a tracer yarn, the tracer yarn enabling a surface layer made up of a polymer alloy to be distinguished visually from an intermediate layer made up of 100% of PEEK resin.

In addition to a method, the invention provides a blade comprising subassemblies made of thermoplastic composite materials as can be obtained by the above method.

Under such circumstances, each subassembly comprises an internal arrangement and at least one external arrangement joined to the internal arrangement, the external arrangement of one subassembly being adhesively bonded to the external arrangement of another subassembly, each internal arrangement comprising a stack of plies referred to as "intermediate" layers, each intermediate layer comprising reinforcing fibers impregnated with a semicrystalline thermoplastic matrix, each external arrangement comprising at least one ply referred to as a "surface" layer, each surface layer comprising reinforcing fibers impregnated with an alloy of a semicrystalline thermoplastic polymer and of an amorphous thermoplastic polymer, and an assembly film comprising an amorphous thermoplastic material being interposed between two surface layers of two distinct subassemblies that are assembled together.

The present invention also provides a method of fabricating the above-mentioned device.

BRIEF DESCRIPTION OF THE DRAWINGS

The invention and its advantages appear in greater detail from the context of the following description of examples given by way of illustration and with reference to the accompanying figures, in which:

FIG. 1 is a diagram showing steps of the method;

FIG. 2 is a diagram showing a subassembly of the method;

FIGS. 3 to 7 are diagrams showing different stages in a step of fabricating subassemblies;

FIGS. 8 to 10 are diagrams showing different types of subassembly;

FIGS. 11 and 12 are diagrams showing a step of preparing to assemble subassemblies together;

FIG. 13 is a diagram showing a cycle for applying heat and pressure; and

FIG. 14 is a diagram showing a blade of the invention.

DETAILED DESCRIPTION OF THE INVENTION

Elements present in more than one of the figures are given the same references in each of them.

FIG. 1 shows the method of the invention for fabricating a blade. Such a blade may be a blade of an aircraft rotor, or it may be a blade of a turbine, or of an airplane propeller, The method comprises a preliminary step STP1 of fabricating subassemblies of the blade out of thermoplastic composite materials.

With reference to FIG. 2, each subassembly 10 may be subdivided into an internal arrangement 15 and at least one external arrangement 20. Each external arrangement 20 is secured to the internal arrangement 15. Furthermore, an external arrangement 20 of one subassembly is for adhesively bonding to an external arrangement of another subassembly.

In the example of FIG. 2, two external arrangements 20 of a subassembly are positioned on either side of the internal arrangement 15 of that subassembly in the thickness direction of the blade. Nevertheless, a single external arrangement 20 could be arranged over or under the internal arrangement 15 of the subassembly 10.

In another aspect, each internal arrangement 15 includes at least one stack of thermoplastic plies referred to for convenience as "intermediate" layers 16. Each intermediate layer 16 includes reinforcing fibers 85 impregnated with a semicrystalline thermoplastic matrix 86. An intermediate layer 16 may be in the form of a set of yarns, a tape, a woven fabric, a sheet, and comparable material.

Each reinforcing fiber 85 of an intermediate layer 16 may be selected from a list comprising in particular: a glass fiber; a carbon fiber; a basalt fiber; and an aramid fiber. Such a reinforcing fiber may be a long fiber.

Furthermore, the semicrystalline thermoplastic matrix 86 may be made of PEEK.

In another aspect, each external arrangement 20 includes at least one thermoplastic ply referred to for convenience as a "surface" layer 21. Each surface layer 21 comprises reinforcing fibers 87 impregnated with an alloy 88, which alloy 88 may comprise a mixture of a semicrystalline thermoplastic polymer and an amorphous thermoplastic polymer.

Each reinforcing fiber 87 of a surface layer 21 should be selected from a list comprising in particular: a glass fiber; a carbon fiber; a basalt fiber; and an aramid fiber. Such a reinforcing fiber may be long fiber.

In addition, the semicrystalline thermoplastic polymer may be PEEK, and the amorphous thermoplastic polymer may be PEI. More precisely, the alloy 88 may comprise 70% PEEK and 30% PEI. These percentages are given with a margin of accuracy of plus or minus 5%. Under such circumstances, the alloy 88 may comprise 65% to 75% PEEK and 25% to 35% PEI.

In addition, each surface layer 21 may include a tracer yarn 25 so as to be capable of being distinguished visually from an intermediate layer 16. Such a tracer yarn may be in the form of a yarn presenting a color different from the other elements of the layer.

In another aspect, the internal arrangement 15 may include a core made in particular from a thermoplastic matrix 17. For example, two stacks of intermediate layers 16 are arranged in the thickness direction on either side of a core. Such a core may comprise a foam of PEI. Furthermore, a bonding layer of the same type as a surface layer may be arranged between an intermediate layer and the core.

In another aspect, each ply 16, 21 of a subassembly may comprise fibers sized with the thermoplastic material corresponding to the ply, namely the semicrystalline thermoplastic matrix 86 for an intermediate layer, and the alloy 88 for a surface layer.

Nevertheless, and with reference to FIG. 3, during the preliminary step STP1, the method may make provision for applying a powder of a thermoplastic polymer on at least one de-sized reinforcing fiber, e.g. using a hopper 61. This thermoplastic polymer is either the semicrystalline thermoplastic matrix 86 for an intermediate layer 16, or else the alloy 88 for a surface layer 21. The powder is then heated, e.g. by an infrared lamp 62 in order to adhere to the fibers.

FIG. 3 shows a roll of woven fabric comprising fibers aligned in two directions (warp direction and weft direction), but any other type of ply could be envisaged.

Furthermore, the method may make provision during the preliminary step STP1 to use preimpregnated materials from cutter stations 63 as shown in FIG. 4, such as conventional ultrasonic cutter tooling, for example.

Under such circumstances, the method proposes making two types of plate, namely plates for intermediate layers and plates for surface layers. Such plates may be stored relatively easily and can be cut up in the cutter stations 63.

In order to fabricate a given subassembly, the cutter stations 63 cut up the plates during the preliminary step STP1 in order to obtain appropriate layers.

Optionally, and with reference to FIG. 5, the various plies of a subassembly are positioned relative to each other in a positioning mold 67.

For example, each ply is welded by a welding station 64 to the ply that was previously deposited on the positioning mold 67. The welding station may possibly provide only one weld spot 68 per ply.

A plurality of plies, or indeed all of the various plies of a subassembly 10, are then transferred together into a fabrication mold 65, as shown in FIG. 6.

In a variant, the plies are arranged in the fabrication mold 65 without previously passing via a positioning mold 67.

Whatever the variant, the step of fabricating subassemblies thus includes a stage of arranging the plies of the arrangements 15, 20 in the fabrication mold 65.

A hot press 66 is then used for compressing and heating the plies of the arrangements 15, 20 on the fabrication mold 65 in application of a heating cycle.

FIG. 7 shows such a heating cycle. In this heating cycle, the plies of the arrangements are heated until they reach a maximum temperature referred to as the "hot" temperature T1, prior to being cooled. The hot temperature T1 may lie in the range 350° C. to 450° C.

If the reinforcing fibers of the plies of the arrangements are de-sized fibers, then the heating cycle may serve to develop fibril seeds and thus lead to semicrystalline growth on the fibers in order to optimize the final fatigue performance of the subassembly.

FIGS. 8 to 10 show various types of subassembly.

Specifically, a subassembly 10 may be a spar 30 as shown in FIG. 8. The spar 30 may include orifices 31 passing through its thickness in order to co-operate with a mounting fitting, for example.

A subassembly 10 may be an outer skin 35 as shown in FIG. 9, or indeed a stiffener 40 as shown in FIG. 10.

A subassembly 10 may also be a trailing edge strip.

With reference to FIG. 1, various subassemblies are thus fabricated during the preliminary step STP1. These subassemblies may be fabricated in campaigns in order to optimize the industrial process. The term "campaign" means that a single type of subassembly is fabricated during a given period. For example, spars may be fabricated for one week, and then outer skins may be fabricated during the following week, and so on.

In order to fabricate a blade, the method further comprises a preparation step STP2 for preparing two assembled-together thermoplastic subassemblies of said blade.

With reference to FIG. 11, the subassemblies 10 of a blade are arranged in an assembly mold 70 during this preparation step STP2.

The assembly mold 70 may include top and bottom backing shapes including means 700 for heating by electromagnetic induction. By way of example, the teaching of document FR 2 918 919 may be used for obtaining a mold provided with induction heater means.

In FIG. 11, a blade may comprise at least one spar 30, at least one trailing edge strip 45, a plurality of stiffeners 40, and a plurality of outer skins 35, which are all arranged in the assembly mold 70.

Outer skins 35 are joined to one another spanwise to form a suction side wall 2, and other outer skins 35 are joined to one another spanwise to form a pressure side wall 3.

In addition, the or each trailing edge strip 45, the or each spar 30, and each stiffener 40 extend at least between the suction side wall 2 and the pressure side wall 3. In particular, a stiffener 40 may have an I-shaped section in order to cover both the junction between two outer skins 35 of the pressure side wall 3 and also the junction between two outer skins 35 of the suction side wall 2.

Furthermore, assembly films 50 are arranged locally in the assembly mold 70. Each assembly film is interposed between two surface layers 21 of two distinct subassemblies that are to be assembled together.

With reference to FIG. 12, the assembly films 50 cover only the zones of the subassemblies that are to be assembled together.

For example, an assembly film may be arranged between two outer skins 35, between an outer skin 35 and a spar 30, between an outer skin 35 and a stiffener 40, between an outer skin 35 and the trailing edge strip 45, . . . .

Each assembly film 50 includes amorphous thermoplastic material 51 and a ferromagnetic member 52. The ferromagnetic member 52 may include particles of ferrite and/or a metal element embedded in the amorphous thermoplastic material 51.

By way of example, the amorphous thermoplastic material 51 includes at least PEI.

In an alternative, the amorphous thermoplastic material 51 comprises PEI only.

In another alternative, the amorphous thermoplastic material 51 comprises PEI, benzophenone, and/or propriophenone.

With reference to FIG. 1, the method then includes an assembly step STP3. During this assembly step STP3, the subassemblies 10 are assembled together in the assembly mold 70 by exerting pressure on the subassemblies 10 while heating each assembly film 50 locally by induction in application of a cycle for applying heat and pressure.

FIG. 13 shows the cycle 90 for applying heat and pressure in the form of one curve C1 showing how the temperature of the assembly films varies, and another curve C2 showing how the pressure of the assembly films varies.

The cycle 90 for applying heat and pressure may comprise a first stage 91 of raising the temperature of the assembly films 50 up to a maximum temperature referred to as the "assembly" temperature T2. The assembly temperature T2 is lower than the hot temperature T1, e.g. lying in the range 150° C. to 210° C.

During a second stage 92, the temperature of the assembly films 50 is maintained at the assembly temperature T2, e.g. for 15 minutes.

During a third stage 93, the temperature of the assembly films 50 is lowered.

The pressure of the assembly films is also increased up to a maximum pressure, substantially together with the increase in temperature.

The maximum pressure is maintained during said stage 92 and during the beginning of the first stage 93.

With reference to FIG. 1, a finishing step STP4 may be carried out at the end of the assembly step STP3.

With reference to FIG. 14, the blade 1 may be prepared for painting and painted at the end of the assembly step STP3, e.g. by applying "powder paint".

Furthermore, by way of example, the blade 1 may be fitted with a leading edge cover 4, with or without a de-icing system, that is put into place by adhesive, and with a fitting 5 for fastening to a hub, or indeed with balance weights 6.

Independently of the finishing, after the assembly step, each subassembly 10 of the blade comprises an internal arrangement 15 and at least one external arrangement 20 joined to the internal arrangement 15, the external arrangement 20 of a subassembly 10 being adhesively bonded to the external arrangement 20 of another subassembly 10, each internal arrangement 15 comprising a stack of plies referred to as "intermediate" layers 16, each intermediate layer 16 comprising reinforcing fibers impregnated with a semicrystalline thermoplastic matrix, each outer arrangement 20 comprising at least one ply referred to as a "surface" layer 21, each surface layer 21 comprising reinforcing fibers impregnated with an alloy of a semicrystalline thermoplastic polymer and an amorphous thermoplastic polymer, an assembly film comprising an amorphous thermoplastic material being interposed between two surface layers 21 of two distinct subassemblies that are assembled to each other.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A fabrication method for fabricating a blade, the method comprising the following steps:
   fabricating subassemblies out of thermoplastic composite materials;
   placing the subassemblies in an assembly mold;
   locally arranging a plurality of assembly films, each assembly film being interposed between two distinct subassemblies that are to be assembled together; and
   assembling the subassemblies together in the assembly mold by exerting pressure on the subassemblies and by locally heating each assembly film by electromagnetic induction in application of a cycle for applying heat and pressure;
   wherein each subassembly comprises an internal arrangement and at least one external arrangement joined to the internal arrangement, the external arrangement of one subassembly being for adhesively bonding to an external arrangement of another subassembly, each internal arrangement comprising a stack of plies referred to as "intermediate" layers, each intermediate layer comprising reinforcing fibers impregnated with a semicrystalline thermoplastic matrix, each external arrangement comprising at least one ply referred to as a "surface" layer, each surface layer comprising reinforcing fibers impregnated with an alloy of a semicrystalline thermoplastic polymer and an amorphous thermoplastic polymer, each assembly film comprising an amorphous thermoplastic material and a ferromagnetic member.

2. The fabrication method according to claim 1, wherein each reinforcing fiber is selected from a list consisting of: a glass fiber; a carbon fiber; a basalt fiber, and an aramid fiber.

3. The fabrication method according to claim 1, wherein each subassembly is selected from a list consisting of: a spar; a stiffener; an outer skin; and a trailing edge strip.

4. The fabrication method according to claim 1, wherein the blade comprises at least one spar, at least one trailing edge strip, a plurality of stiffeners, and a plurality of outer skins, outer skins being joined to one another spanwise in order to form a suction side wall, outer skins being joined to one another spanwise in order to form a pressure side wall, the or each trailing edge strip, the or each spar, and each stiffener extending between the suction side wall and the pressure side wall, at least one stiffener being located at the junction between two outer skins in the pressure side wall and two outer skins in the suction side wall.

5. The fabrication method according to claim 1, wherein the semicrystalline thermoplastic matrix is poly ether ether ketone.

6. The fabrication method according to claim 1, wherein the semicrystalline thermoplastic polymer is poly ether ether ketone, and the amorphous thermoplastic polymer is poly ether imide.

7. The fabrication method according to claim 1, wherein the alloy of a semicrystalline thermoplastic polymer and of an amorphous thermoplastic polymer comprises 70% poly ether ether ketone and 30% poly ether imide.

8. The fabrication method according to claim 1, wherein the amorphous thermoplastic material comprises at least poly ether imide.

9. The fabrication method according to claim 1, wherein the ferromagnetic member comprises particles of ferrite or a metal element.

10. The fabrication method according to claim 1, wherein the amorphous thermoplastic material includes benzophenone and/or propriophenone.

11. The fabrication method according to claim 1, wherein the step of fabricating subassemblies comprises the following stages for fabricating a subassembly:
    arranging the plies in a fabrication mold; and
    heating the plies in the fabrication mold in application of a heating cycle that reaches a maximum temperature referred to as "hot" temperature.

12. The fabrication method according to claim 11, wherein the plies of a subassembly comprise sized fibers.

13. The fabrication method according to claim 11, wherein, prior to the stage of arranging the plies in a fabrication mold, the step of fabricating subassemblies comprises the following stages:
    depositing plies one by one in a positioning mold, each ply deposited in the positioning mold being locally welded to the previously deposited ply; and
    transferring the plies from the positioning mold to the fabrication mold.

14. The fabrication method according to claim 11, wherein the cycle of applying heat and pressure comprises a stage of raising the temperature of the assembly films to a maximum temperature referred to as the "assembly" temperature, a stage of maintaining the assembly temperature, followed by a stage of reducing the temperature of the assembly films, the assembly temperature being lower than the hot temperature.

15. The fabrication method according to claim 14, wherein the assembly temperature lies in the range 150° C. to 210° C., the hot temperature lying in the range 350° C. to 450° C.

16. The fabrication method according to claim 1, wherein each surface layer (includes a tracer yarn enabling a surface layer to be distinguished visually from an intermediate layer.

17. The fabrication method according to claim 12, further comprising prior to the stage of arranging the plies in a fabrication mold, the step of fabricating subassemblies comprises the following fabrication stages:

applying a power of thermoplastic polymer on at least one de-sized reinforcing fiber; and bonding the thermoplastic polymer onto the de-sized reinforcing fiber by heating to form the sized fibers.

18. The fabrication method according to claim 1, wherein the reinforcing fiber comprises synthetic fiber.

19. The fabrication method according to claim 1, wherein the subassemblies comprise blade components.

20. A fabrication method for fabricating a blade, the method comprising:

providing subassemblies made of thermoplastic composite materials;

placing the subassemblies in an assembly mold;

locally arranging a plurality of assembly films, each assembly film being interposed between two distinct subassemblies that are to be assembled together; and assembling the subassemblies together in the assembly mold by exerting pressure on the subassemblies and by heating each assembly film by electromagnetic induction in application of a cycle for applying heat and pressure;

wherein each subassembly comprises an internal arrangement and at least one external arrangement joined to the internal arrangement, the external arrangement of one subassembly being for adhesively bonding to an external arrangement of another subassembly, each internal arrangement comprising a stack of plies referred to as "intermediate" layers, each intermediate layer comprising reinforcing fibers impregnated with a semicrystalline thermoplastic matrix, each external arrangement comprising at least one ply referred to as a "surface" layer, each surface layer comprising reinforcing fibers impregnated with an alloy of a semicrystalline thermoplastic polymer and an amorphous thermoplastic polymer, each assembly film comprising an amorphous thermoplastic material and a ferromagnetic member.

* * * * *